April 15, 1969 P. GOITIANDIA ET AL 3,439,181

DUAL SET POINT SOLID STATE RELAY

Filed March 10, 1967 Sheet 1 of 2

INVENTORS
Peter Goitiandia
Austin T. Kelly

BY [signature]

ATTORNEY

April 15, 1969 P. GOITIANDIA ET AL 3,439,181

DUAL SET POINT SOLID STATE RELAY

Filed March 10, 1967 Sheet 2 of 2

United States Patent Office 3,439,181

Patented Apr. 15, 1969

3,439,181

DUAL SET POINT SOLID STATE RELAY

Peter Goitiandia, Union, and Austin T. Kelly, Morristown, N.J., assignors to Weston Instruments, Inc., Newark, N.J., a corporation of Delaware Filed Mar. 10, 1967, Ser. No. 622,235
Int. Cl. H02j 3/14
U.S. Cl. 307—38 9 Claims

ABSTRACT OF THE DISCLOSURE

A dual set point solid state relay for controlling the application of load power to at least two loads. The relay alternately samples each set point for alternate sampling intervals and alternately compares the amplitude of an input signal to each set point signal. A different one of a pair of control devices is partially enabled during each alternate sampling interval and is fully enabled when the input signal undergoes an amplitude transition about one of the set point signals. Each control device, when fully enabled, operates to connect an associated load to a source of load power.

The relay may be readily and easily switched to provide any one of four modes of load state for a given range of input signal amplitude.

This invention relates generally to solid state relays and, more particularly, to a dual set point solid state relay.

Dual set point solid state relays are commercially available for controlling the application of electrical power to a single load device such as a solenoid, motor, or the like. For certain commercial applications, it is desirable to control the application of the power source to a pair of load devices using, for this purpose, only one solid state relay and a single variable amplitude D.C. input signal. In other instances, it is desirable to have a single solid state relay which may be readily and easily connected to provide one of several modes of load control to a plurality of load devices.

It is an object of this invention to provide a dual set point solid state relay for controlling the application of power to a plurality of load devices in response to a variable amplitude input signal.

Another object of this invention is the provision of a dual set point solid state relay which may be readily and easily connected to provide one of several modes of load control to a plurality of load devices.

According to this invention, a dual set point solid state relay is provided which includes first and second load controls of a conventional solid state type for controlling the state of at least one load apiece. Each control may be activated by a gating signal to selectively connect an associated load to a source of energizing alternating current. The gating signals for the first and second load controls are received from respective first and second gating devices, each gating device requiring a synchronizing voltage pulse and a coincidental voltage signal of predetermined polarity to produce a gating signal. The first and second gating devices are synchronized by respective positive and negative half cycles of alternating current that may be received from the same source that energizes the loads. First and second set point signals representing respective first and second relay set points are alternately sampled each half cycle of the alternating current; each set point signal having an amplitude that is proportional to the setting of its respective set point. The sampled first and second set point signals are alternately compared by a comparator with the amplitude of the input or source signal that is applied to the relay to control the operation thereof. The comparator produces alternate first and second output voltage signals which are in phase with the respective first and second set point signals from which these voltage signals are derived. Each output voltage signal produced by the comparator has one of two polarities depending upon the amplitude of each set point signal as compared with the amplitude of the input signal and both output voltage signals are alternately supplied to the gating devices at the set point sampling frequency. If the input signal, in going through an amplitude transition, passes through a first or a second set point, a reversal of voltage polarity will be detected by the comparator during each half cycle when the corresponding first or second set point signal is being compared to the input signal. This reversal in voltage polarity will cause the first or second gating device which is synchronized to that corresponding set point to either produce a gating pulse to its associated control or to cease generating gating pulses. In either case, the state of the associated load may reverse as a result of the input signal passing through one of the established set point signals.

The relay of this invention may be readily connected to provide any one of four modes of load state for a given range of input signal amplitude and two set points that provide set point signals that lie within that range. Depending upon the particular connections of the relay, neither, both or either one of the controls may receive a gating pulse for a given signal amplitude range.

For a better understanding of the present invention, together with other and further objects thereof, reference may be had to the following description taken in connection with the accompanying drawings, the scope of the invention being pointed out in the appended claims.

Referring to the drawings.

FIGURES 3A–3D, inclusive, illustrate four possible relay connections which will provide one of four modes of load control by the relay of this invention.

*Brief description of the invention*

Figure 1:
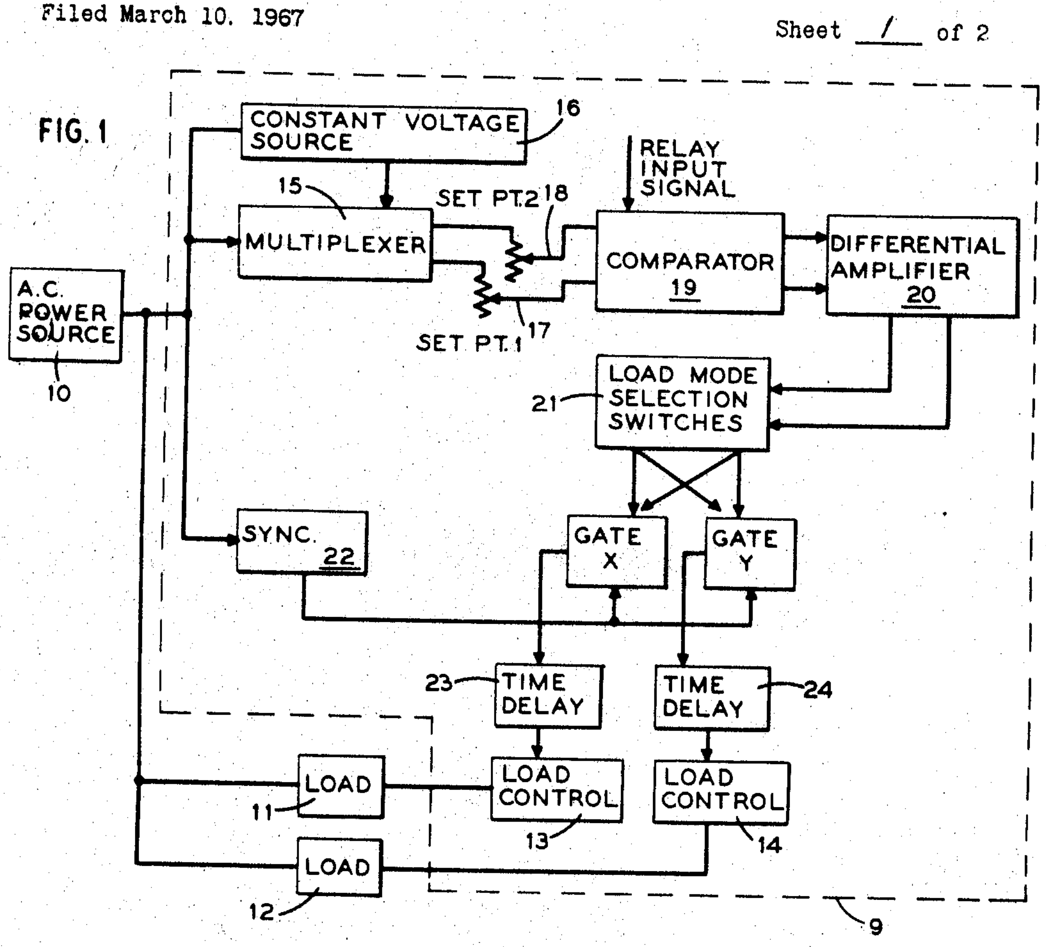
FIGURE 1 is a schematic block diagram of the dual set point solid state relay according to this invention.

Referring to FIGURE 1 of the drawings, the solid state relay of this invention is delineated by a group of broken lines and is referred to generally by the numeral 9. An A.C. power source 10 is connected to supply electrical power to a load 11 and/or a load 12 whenever a respective load control 13 and/or 14 of the relay 9 is energized. The loads 11 and 12 are representative of any two loads, such as a pair of electrical motors, or solenoids, which are to be controlled by operation of the relay 9 in response to an input signal which is applied to the relay. The input signal may be an analog current or voltage derived from any suitable source, such as a thermocouple, and may vary in amplitude at a relatively slow rate compared to the frequency at which the relay 9 is driven.

The load controls 13 and 14 are of a conventional solid state type and are characterized as being individually energizable by a gating pulse to connect the source 10 to the corresponding load 11 or 12.

In addition to the load controls 13 and 14, the relay 9 includes a multiplexer 15 which is alternately driven by the alternating current from the power source 10. The multiplexer 15 includes a pair of transistors which alternately turn on every half cycle of the alternating current. Through alternate turning on of these transistors, the set point signal amplitudes are alternately sampled.

The set point 1 of the relay comprises a potentiometer having a wiper arm 17 which may be adjusted to tap off a predetermined amplitude of D.C. voltage or current from a source 16 that may be a constant amplitude voltage source. Similarly, the set point 2 of the relay comprises a potentiometer having a wiper arm 18 which may be similarly adjusted to tap off another amplitude of D.C. voltage or current from the source 16. Through the chopping action of the multiplexer 15, the set point signal amplitudes are alternately sampled and applied as alternate pairs of input pulses to a comparator 19.

The comparator 19 also receives an input signal which varies in amplitude as the condition or conditions which control the operation of the relay vary. The comparator 19 alternately compares the relative amplitudes of each set point signal and the amplitude of the input signal and supplies this information as first and second voltage signals to a differential amplifier 20.

The differential amplifier 20 includes at least one pair of transistors, one of the transistors being initially biased to conduct more current that the other transistor. The voltage output of the amplifier 20 is supplied to a pair of load mode selection switches 21 which may be initially set to apply one of the output voltages from the differential amplifier 20 as an enabling pulse to either a gate X or a gate Y, or to both gates X and Y. The gates X and Y are synchronized to the set points 1 and 2, respectively, by a synchronizer 22 which is driven by alternating current from the source 10 in phase with the multiplexer 15. Thus, during each half cycle that the set point 1 is being sampled by the multiplexer 15, the synchronizer 22 applies a synchronizing pulse to the gate X which conditions or partially enables that gate. Conversely, during each alternate half cycle when the set point 2 is being sampled, the synchronizer 22 applies a synchronizing pulse to the gate Y which partially enables this gate, the partial enabling of the gate Y by the synchronizer 22 therefore being 180° out of phase with the partial enabling of the gate X and occurring once every period of the alternating current. One or both of the gates X and Y may be fully enabled during a corresponding set point sampling interval by an output voltage signal of a predetermined polarity that is supplied thereto by the differential amplifier 20. When the gate X or Y is fully enabled, it provides a gating pulse that activates a respective load control 13 or 14 to connect the respective loads 11 and 12 to the source 10. Because the gates X and Y are alternately disabled once every half cycle of the alternating current, time relays 23 and 24 are provided to hold the load controls 13 and 14, respectively, activated (and thus the corresponding load 11 or 12 connected to the source 10) for extended periods of time.

Since the comparator 19 alternately compares the relative amplitudes of the set point signals with the coincidental amplitude of the input signal, the polarity of the voltage output from the comparator 19 will change every time the input signal, in going through an amplitude transition, becomes greater or less than the relative value of one or the other of the set point signals. With the set points 1 and 2 set to provide different amplitude set point signals, the relay input signal will pass through one set point before it passes through the other. A reversal of voltage polarity of the voltage output from the comparator 19 occurs when the input signal becomes greater or less than the corresponding value of one of the set point signals. A change in the output voltage polarity of the comparator 19 is detected by the differential amplifier 20 and transmitted as a differential voltage signal through the load selection switches 21 to the gate X or the gate Y which is coincidentally partially enabled during the same half cycle interval. Depending upon the position of the mode selection switches, the gate X or Y which is partially enabled during a respective positive or negative half cycle may be fully enabled or, on the other hand, may be disabled by the reversal in voltage polarity. If a particular gate is disabled, a gating pulse will not be supplied to the associated load control 13 or 14. If the associated load control is then taken in an activated state, the time delay 23 or 24 may continue to hold the load controls 13 or 14 activated for an additional predetermined length of time after which the load control will be deactivated unless it receives another gating pulse from its associated gate in the interim.

For any given range of relay input signal amplitude, the switches 21 may be set to provide any one of four modes of load state. FIGURES 3A–3D illustrate the combinations of connections which will provide one of these four modes.

*Detailed description of the invention*

Figure 2:
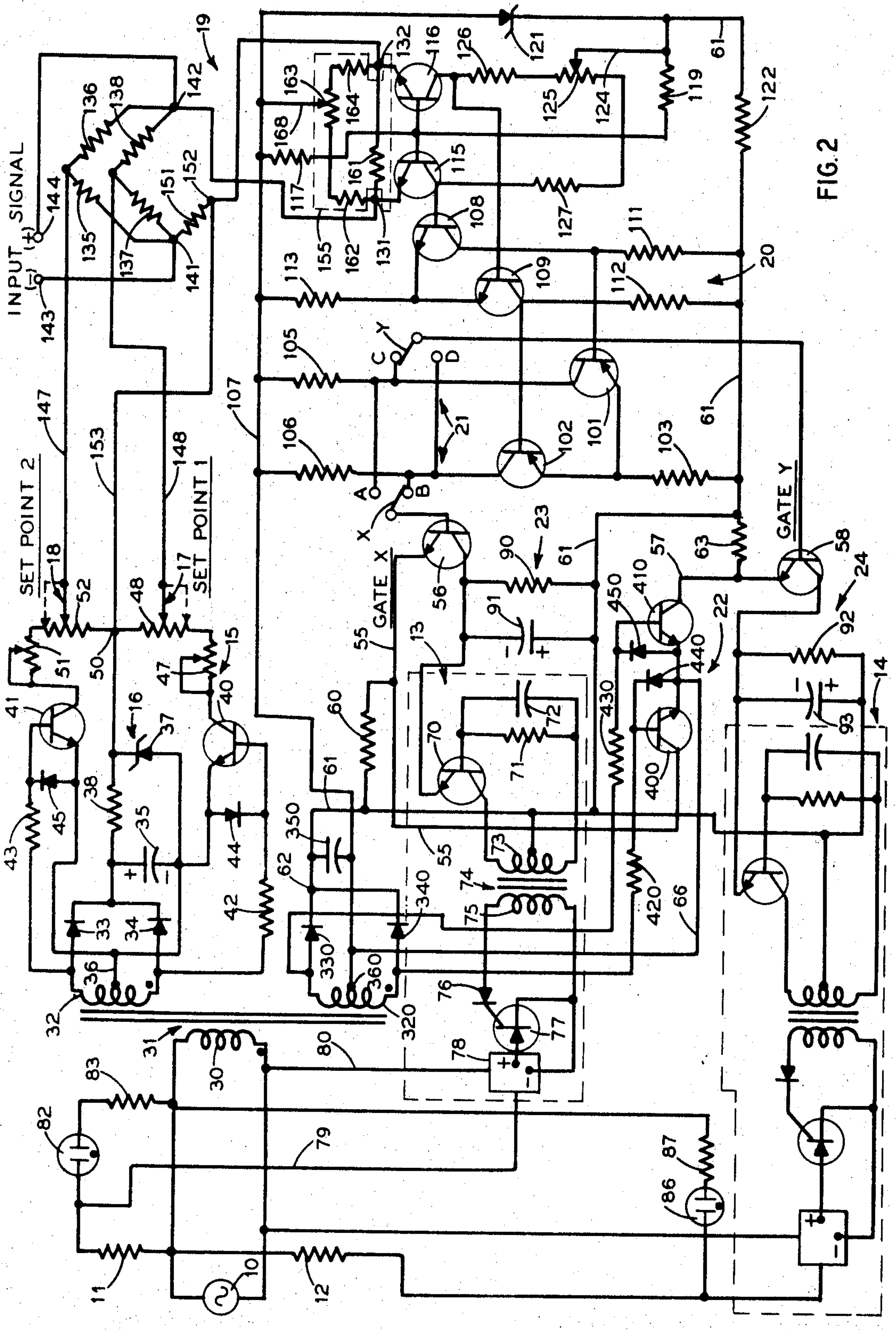
FIGURE 2 is a detailed schematic diagram of the solid state relay of this invention.

Referring now to FIGURE 2 for a more complete understanding of the invention, the A.C. power source 10 supplies current at a frequency of, for example, 60 Hz. and an amplitude of, for example, 120 volts, to the primary winding 30 of a transformer 31.

The transformer 31 includes a center tapped secondary winding 32 of indicated polarity and a pair of rectifying diodes 33 and 34 which full wave rectify the alternating current induced in the secondary winding 32. An A.C. filter capacitor 35 has one plate connected to the cathodes of both diodes 33 and 34 and to a center tap 36 which makes contact with the midpoint of the winding 32 and, thus, provides a source of constant negative potential for the multiplexer 15 and for the constant voltage source 16, and a reference "ground" for this part of the relay. The constant voltage source 16 comprises a Zener diode 37 connected across the capacitor 35 with the cathode of the diode 37 connected through a current limiting resistor 38 to the positive plate of the capacitor 35. The Zener diode 37 is characterized as having a predetermined reverse breakdown voltage which maintains the voltage at its cathode terminal at a constant positive voltage amplitude, thereby maintaining a constant amplitude positive voltage for the set point wiper arms 17 and 18.

The muliplexer 15 includes a pair of transistors 40 and 41 of the same conductivity type having base electrodes coupled through base resistors 42 and 43, respectively, to opposite terminals of the secondary winding 32. A pair of clamping diodes 44 and 45, connected across the base and emitter electrodes of the transistors 40 and 41, respectively, prevent the transistors 40 and 41, respectively, from exceeding their maximum reverse base-to-emitter voltage during respective negative and positive half cycles of the alternating current which is induced in the winding 32. The collector electrode of the transistor 40 is connected through a variable trimming resistor 47 to a potentiometer, comprising a fixed resistor 48 and the first set point wiper arm 17. One end of the resistor 48 is connected to a terminal 50 which is clamped at a constant positive voltage level by the Zener diode 37. Similarly, the collector electrode of the transistor 41 is connected through a variable trimming resistor 51, to a second potentiometer comprising a fixed resistor 52 and the second set point wiper arm 18. One end of the resistor 48 is connected to the terminal 50. The amplitudes of the two D.C. voltages (or currents) which are tapped off from the terminal 50 by the two wiper arms 17 and 18 will obviously depend upon the relative positions of the arms 17 and 18 with respect to the resistors 48 and 52, respectively.

The wiper arms 17 and 18 may be individually connected to a pair of dials, not shown, mounted for manual rotation on a casing, not shown, employed to house the circuitry of the solid state relay. These dials may be referenced to graduations of a pair of scales calibrated in terms of the particular parameter, such as current, voltage or temperature which is to control the operation of the relay. By turning such dials, the positions of the wiper arms 17 and 18 relative to the resistors 48 and 52 may be changed to establish two different set points for the relay. Either wiper arm 17 or 18 may be used to establish the set point which is "low" or the "high" relative to the normal or usual amplitude range of the input signal. The set points establish two set point signal levels in the input signal amplitude range, each level being selected as to cause a change in state of the relay and the load or loads controlled thereby if the input signal passes that level in going through an amplitude transition.

Through the chopping action of the multiplexer 15, the voltages which appear between the wiper arm 17 and the terminal 50 and between the wiper arm 18 and the terminal 50 are individually sampled at the frequency of the alternating current which is received from the source 10. This sampling frequency is typically much higher than the time-carrying D.C. input signal since the amplitude of the latter signal normally varies somewhat slowly with time. Considering this aspect of the invention in greater detail, during each positive half cycle of the alternating current, the base-emitter electrodes of the transistor 40 will be forward-biased and the transistor 40 turned on to connect the collector terminal of the resistor 48 to the negative D.C. voltage which is tapped off the secondary winding 32 by the tap 36. The sampled voltage (or current) which is tapped off the resistor 48 by the wiper arm 17 will be received as a positive voltage (or current) pulse by the comparator 19. During each negative half cycle of the alternating current, the cathode of the diode 44 is driven to more negative voltage than its anode and the diode 44 will thus clamp from the emitter-base electrodes of the transistor 40 at approximately +0.6 volt reverse bias so as to protect the transistor from exceeding its maximum reverse base-to-emitter voltage. Conversely, during each positive half cycle of the alternating current induced in the winding 32, the diode 45 clamps the transistor 41 so that its base-to-emitter voltage does not exceed approximately +0.6 volt. As will be apparent, the transistor 41 turns on during each negative half cycle of the alternating current and the sampled voltage (or current) which is tapped off the resistor 52 by the wiper arm 18 is applied as a positive voltage (or current) pulse to the comparator 19. Thus, through the chopping action of the transistors 40 and 41, the two set point voltages are alternately sampled and applied as pairs of successive positive pulses to the comparator 19 at the frequency of the alternating current. The amplitude of each set point signal is then alternately compared with the amplitude of the relay input signal.

The transformer 31 has a secondary winding which is similar to the winding 32 and, accordingly, is designated by the numeral 320. All components receiving current from the secondary winding 320 which are similar to the aforedescribed components comprising the multiplexer 15 and the constant voltage source 16 are designated by decimal numbers having the same tens and hundreds digits followed by the units digit "0." To illustrate, the diodes 330 and 340 are similar to the aforedescribed diodes 33 and 34, are poled away from the winding 320 and serve the same function as the latter diodes, that is, to provide full wave rectification of the alternating current which is induced in the winding 320. Reference "ground" for this part of the relay is provided by the negative voltage on center tap 360. The transistor 400 having a base resistor 420 and a clamping diode 400 turns on in phase with the transistor 40 during each positive half cycle of the alternating current supplied by the source 10, and transistor 410 having a base resistor 430 and a clamping diode 450 turns on in phase with the transistor 41 during each negative half cycle of this alternative current. Accordingly, the transistors 400 and 410 are phase-locked or synchronized to the transistors 40 and 41, respectively.

As each transistor 400 and 410 turns on in succession, an enabling pulse is supplied to the emitter electrode of NAND logic gate X and NAND logic gate Y, respectively, comprising NPN transistors 56 and 58, respectively. Thus, each NAND gate is conditioned or partially enabled during each sampling interval when one of the set point signals is being compared to the input signal by the comparator 19. More specifically, the transistor 55 is conditioned to turn on during the sampling interval when the amplitude of the set point signal from the set point 1 is being compared to the amplitude of the input signal and the transistor 58 is conditioned to turn on during the sampling interval when the amplitude of the set point signal from the set point 2 is being compared to the input signal amplitude.

Considering now this aspect of the invention in greater detail, the collector electrode of the transistor 400 is connected by a lead 55 to the emitter electrode of the transistor 56 and the collector electrode of the transistor 410 is connected by a lead 57 to the emitter electrode of the transistor 58. The emitter electrode of the transistor 56 and the collector electrode of the transistor 400 are connected through a current-limiting resistor 60 of relatively high resistance value to a lead 61. The lead 61 receives positive D.C. voltage from a terminal 62 that is common to the cathode terminals of the diodes 330 and 340. Similarly, the emitter electrode of the transistor 58 and the collector electrode of the transistor 410 are connected to the lead 61 through a current-limiting resistor 63, which may have the same resistance value as the resistor 60. The emitter electrodes of the transistors 400 and 410 are connected by a lead 66 to the negative D.C. voltage tap 360.

Gates X and Y may be fully enabled to initiate operation of respective load controls 13 and 14. Since both controls 13 and 14 are conventional and may be similarly constructed, a brief description of the control 13 will also suffice as a description of the control 14.

The control 13, delineated by a group of broken lines in FIGURE 2, includes a conventional blocking oscillator comprising a transistor 70 of the same conductivity type as the transistor 56 and having its emitter electrode connected to the collector electrode of the transistor 56. The base electrode of the transistor 70 is connected to one terminal of a resistance-capacitance circuit formed by a resistor 71 and a capacitor 72 connected in parallel. The lower terminal of this parallel circuit is connected to one end of a center-tapped primary winding 73 of a transformer 74. The opposite end of the primary winding 73 is connected to the collector of the transistor 70. The primary winding 73 is connected to the positive voltage lead 61 through its center tap so that each time the transistor 70 turns the primary winding 73 is energized. The blocking oscillator is inductively coupled through transformer 74 to a secondary transformer winding 75.

One terminal of the secondary winding 75 is connected to the anode of a diode 76 having its cathode connected to the gate electrode of a silicon controlled rectifier 77. The opposite terminal of the secondary winding 75 is connected to the cathode of the rectifier 77 and, in addition, to the negative D.C. terminal of a four-diode bridge rectifier, designated generally at 78. The positive D.C. terminal of the bridge rectifier 78 is connected to the anode of the controlled rectifier 77. The two A.C. terminals of the rectifier 78 are connected in series by leads 79 and 80 to the A.C. power source 10 and the load 11, as well as to an indicating lamp or gas tube 82 which illuminates when the load 11 receives A.C. power from the source 10. The lamp 82 provides a visual indication as to whether or not the load 11 is being powered by the source 10. The flow of current through the lamp 82 is restricted by a current-limiting resistor 83.

When the gate X is fully enabled the transistor 56 turns on; the synchronizing transistor 400 will also be turned on and the emitter electrode of the transistor 70 will receive a negative voltage gating pulse from the emitter electrode of the transistor 56. This negative voltage gating pulse will pull the emitter electrode potential of the transistor 70 sufficiently negative with respect to the potential of its base electrode to drive the transistor 70 into saturation. Once the transistor 70 turns on, the capacitance provided by capacitor 72 and the inductance provided by the primary winding 73 provide the base-to-collector feedback necessary to generate continued oscillation of the blocking oscillator. The frequency of oscillations of the oscillator is, of course, considerably higher than the frequency of the source 10. The oscillating pulses generated by the oscillator are coupled through the transformer 74 to the secondary winding 75, converted into positive pulses by the diode 76 and applied as such to the gate electrode of the controlled rectifier 77. The positive pulses applied to the gate electrode of the controlled rectifier 77 cause the rectifier 77 to turn on and complete a circuit between the positive and negative D.C. terminals of the bridge rectifier 78, thus allowing current flow between the A.C. terminals of the bridge rectifier. This current is received by the load 11 and the lamp 82, the latter illuminating to provide a visual indication of this condition.

In a similar manner and for the same reason, when the gate Y is fully enabled it produces a negative voltage gating pulse and the control 14, which is also delineated by broken lines in FIGURE 2, is energized and connects the A.C. power source 10 to the load 12. Visual indication that the load 12 is receiving power is provided through illumination of a lamp or gas tube 86 having a current-limiting resistor 87 in series therewith.

With the transistors 40 and 400 in a phase-locked relationship and the transistors 41 and 410 also phase-locked, the transistors 400 and 410 alternately turn on for an interval of one-half of the period of the current received from the source 10. Assuming that the frequency of this current is 60 Hz., the transistors 400 and 410 will remain turned on for only $\frac{1}{120}$th of a second and, thus, gates X and Y, respectively, are disabled every $\frac{1}{120}$ of a second.

The prevent the controls 13 and 14 from turning off $\frac{1}{120}$ of a second after being turned on by the disabling of their associated gates X and Y, a predetermined time delay is provided to the deenergization of the controls 13 and 14 by a resistance-capacitance circuits 23 and 24 coupled between the controls 13 and 14, respectively, and transistors 56 and 58, respectively.

The resistance-capacitance circuit associated with the transistor 56 and the control 13 comprises a resistor 90 and an electrolytic capacitor 91 of indicated polarity. The capacitor 91 charges when the transistor 56 is fully enabled and connects the negative plate of the capacitor 91 through the lead 55, through the turned on transistor 400 to the negative D.C. voltage lead 66. When the transistor 56 is subsequently disabled it disconnects the negative plate of the capacitor 91 from the leads 55 and 66, the capacitor 91 will then discharge through the resistor 90 and maintain a negative potential on the emitter electrode of the transistor 70 of sufficient magnitude to hold the transistor 70 in a state of conduction and the blocking oscillator of the control 13 in a state of oscillation. By maintaining this blocking oscillator in a state of oscillation, the control 13 remains energized to couple the load 11 to the source 10.

The RC time constant of the resistor 90 and the capacitor 91 establishes the length of time during which the oscillator of the control 13 is maintained in an oscillating state and this time constant may be on the order of, for example, 8 milliseconds. Assuming that the gate X remains disabled, as the capacitor 91 discharges to a level such that the voltage across its plates is no longer sufficient to hold the transistor 70 in a conductive state, the transistor 70 turns off and terminates the oscillation of the control 13, the control 13 thereupon disconnecting the load 11 from the source 10. If, however, the transistor 56 is turned on during the interval when the transistor 70 is held turned on by the discharging of the capacitor 91, the capacitor 91 will recharge and continue the energization of the control 13 for an additional period of time as again determined by the RC time constant of the resistor 90 and the capacitor 91.

Similarly, the transistor 58 is coupled to the blocking oscillator of the control 14 through an RC circuit comprising a resistor 92 and an electrolytic capacitor 93 of indicated polarity. Again, depending upon the RC time constant provided by the parallel combination of the resistor 92 and the capacitor 93, the blocking oscillator of the control 14 will be held in an oscillating state for a predetermined time interval after the transistor 58 turns off. The RC time constant of the resistor 92 and the capacitor 93 may be equal to that provided by the resistor 90 and the capacitor 91 so that when either the transistor 56 or the transistor 58 turns on, its associated controls 13 and 14 will energize and connect the source 10 to the loads 11 and 12, respectively, for equal intervals of time. Obviously, the RC time constants of the circuits may also be different so that one oscillator has a longer period of oscillation than the other.

The base electrode of the transistor 56 may be selectively connected through a switch X, which may comprise a lead or conductive link, to contacts A or B, the contact A being connected to the collector electrode of transistor 101 and the contact B being connected to the collector electrode of transistor 102. The transistors 101 and 102 comprise the last stage of the three stage differential amplifier 20 and have their emitter electrodes tied together in a common emitter configuration to one terminal of an emitter resistor 103, the other terminal of the resistor 103 being connected to a positive voltage line 107. The collector terminals of the transistors 101 and 102 are connected through collector resistors 105 and 106, respectively, to a negative D.C. voltage line 61 which connects to the negative voltage tap 360.

The base electrode of the transistor 58 may be similarly selectively connected by a switch Y to contacts C or D which are electrically connected to the collector electrodes of the transistors 101 and 102, respectively. The switches X and Y may comprise leads or electrically conductive links and the contacts A, B, C and D may be mounted external of the casing which encloses the circuitry of the relay to facilitate the changing of contact connections.

Figure 3A:
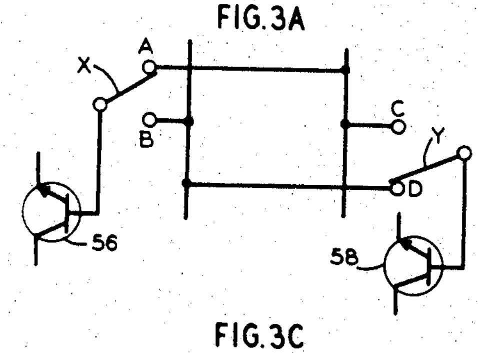
Figure 3B:
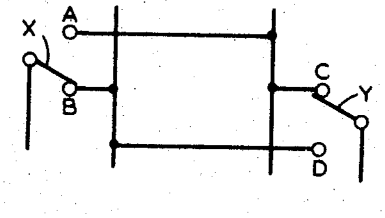

Four possible combinations of connections between the base electrodes of the transistor 56 and 58 and the colector electrodes of the transistors 101 and 102 are provided by the switches X and Y, each combination being depicted by one of the FIGURES 3A–3D, inclusive. FIGURE 3B depicts the positions of the switches X and Y in FIGURE 2.

The switches X and Y provide any one of four possible modes of load energization by a variable range input signal which is applied to the relay. Table 1 hereinbelow, sets forth in tabulated form the state of each load 11 and 12 for a corresponding range of input signal amplitude. It will be understood, however, that these ranges are merely exemplary of two possible selected set point signal values. Obviously, in any given relay circuit these values will change with different ranges of input signal amplitudes and with different selected settings of the set points 1 and 2.

TABLE I

| Figure of drawing illustating position of switches X and Y | Ranges of input signal amplitude (μamps) | Loads receiving power from source 10 |
|---|---|---|
| 3A | (1) 0–19 | — 12 |
| | (2) 20–50 | 11 12 |
| | (3) 51–100 | 11 — |
| 3B | (1) 0–19 | 11 — |
| | (2) 20–50 | — — |
| | (3) 51–100 | — 12 |
| 3C | (1) 0–19 | 11 12 |
| | (2) 20–50 | — 12 |
| | (3) 51–100 | — — |
| 3D | (1) 0–19 | — — |
| | (2) 20–50 | 11 — |
| | (3) 51–100 | 11 12 |

To obtain data for Table I, prior to the application of an input signal from a manually adjustable variable current supply, the transistor 102 is initially rendered sufficiently more conductive than the transistor 101 to partially enable gate X but not the gate Y, through means which will be described in greater detail subsequently. The wiper arm 17 is set to tap off one set point signal corresponding to 20 microamperes of input signal amplitude from the terminal 50 and the wiper arm 18 is set to tap off another set point signal corresponding to 50 microamperes of input signal amplitude from the terminal 50. These values obviously could be expressed in terms of voltage amplitudes rather than current amplitudes since the terminal 50 is maintained at a constant voltage level.

For reasons which will also be disclosed in greater detail subsequently, with the switches X and Y in the positions depicted by FIGURES 2 and 3B if a regulated input signal is then applied to the relay and the input signal amplitude is increased from 0 to 19 microamperes, Table I, second row, range (1), the gate X, FIGURE 2, will be enabled during alternate positive half cycles to energize the control 13 so that the load 11 is connected to and energized by the source 10. The gate Y remains disabled during the negative half cycles for this range of input signal amplitude; the control 14 remains deenergized and, consequently, the load 12 remains decoupled from the source 10.

As the input signal amplitude is increased to a value which slightly exceeds 20 microamperes but does not exceed 50 microamperes, Table I, second row, range (2), the transistor 101 will be rendered more conductive than the transistor 102. The gate X will now be disabled and the gate Y will remain disabled. If the value of the input signal amplitude remains in this range for more than the predetermined period of time established by the time delay 23, FIGURE 2, the control 13 will deenergize and decouple the load 11 from the source 10. Since the gate Y has not been enabled, the load 12 will remain decoupled from the source 10. Thus, once steady state conditions are attained, neither load 11 nor 12 will be energized, Table I, second row, range (2). If the input signal amplitude is further increase so that the input signal amplitude, in effect, passes through the 50 microamperes threshold established by set point 2, Table I, second row, range (3), the gate X will remain disabled but the gate Y will reflect the fact that the input signal amplitude has passed through its corresponding set point and will be enabled during each negative half cycle. As a result, the control 14 will be energized to connect the load 12 to the source 10.

To further illustrate this aspect of the invention, assume that the switches X and Y are connected to the contacts A and C, respectively, as depicted by FIGURE 3A and that the set point 1 is set to tap off a set point current from the terminal 50 which corresponds to 20 microamperes of input signal, FIGURE 2, and the set point 2 set to tap off a set point current from the terminal 50 which corresponds to 50 microamperes of input signal. Again, assuming that the transistor 102 is initially rendered more conductive than the transistor 101, the load 12 will be energized when the input signal remains less than 20 microamperes, Table I, first row, range (1), both loads 11 and 12 will be energized when the input signal is within the intermediate range, range (2), established by set points 1 and 2 and only the load 11 will be energized when the input signal is in range (3).

Figure 3C:
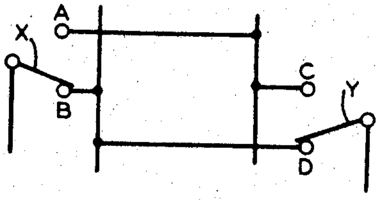
Figure 3D:
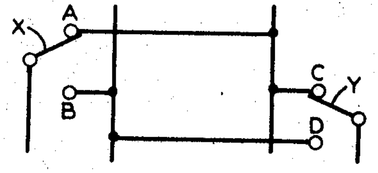

The positions of the switches X and Y in FIGURES 3C and 3D will provide the two modes of load state that appear in tabulated form in the third and fourth rows, respectively, of the Table I. With the set point signals expressed in terms of voltage rather than current, the amplitude ranges of the input signal could also be expressed in terms of voltage amplitudes rather than current amplitudes.

Although the operation of this part of the circuit will be described in greater detail subsequently, an examination of Table I will bear out the fact that the switches X and Y may be employed to established any one of four modes of load state for a prescribed range of input signal amplitude; in the above example this range is at least from 19 to 51 microamperes. Further, it is important to note that every time the input signal passes either set point signal as a result of changing amplitude levels the state of at least one of the loads 11 or 12 change.

Referring again to FIGURE 2, the base electrodes of the transistors 101 and 102 are connected to the collector electrodes of transistors 108 and 109 of opposite conductivity type to the transistors 101 and 102. Collector resistor 111 of the transistor 108 is connected to the positive voltage lead 61 and collector resistor 112 of the transistor 109 is similarly connected to the lead 61. The emitter electrodes of these transistors are joined together in a common emitter configuration and connected through a common emitter resistor 113 to the negative voltage line 107. The transistors 108 and 109 comprise a second or intermediate differential amplifier stage which amplifies the voltages received from a first differential amplifier stage comprising transistors 115 and 116 of the same conductivity type as the transistors 108 and 109.

The collector electrodes of the transistors 115 and 116 are connected to the base electrodes of the transistors 108 and 109, respectively, the transistors 115 and 116 being connected in a common base configuration. Resistor 117 connects the base electrodes of transistors 115 and 116 to the negative voltage lead 107 and resistor 119 connects the base electrodes of these transistors to the lead 61 which is maintained at a constant positive potential by a Zener diode 121 having a current-limiting resistor 122 series-connected to its cathode terminal.

A movable wiper arm 124 has one end connected to the cathode of the Zener diode 121 and receives constant positive voltage from the lead 61; the opposite end of the wiper arm 124 contacting a resistor 125. The resistor 125 has one end connected to the collector electrode of the transistor 116 through collector resistor 126 and to the base electrode of the transistor 109. The other end of the resistor 125 is connected through collector resistor 127 to the collector electrode of transistor 115 and to the base electrode of transistor 108. The wiper arm 124 may be moved along the resistor 125 to provide the desired bias and, hence, the desired relative amounts of conduction of each pair of transistors comprising the first and second stages, the third amplifying stage comprising the transistors 101 and 102 being biased by the voltages on the collector electrodes of the transistors 108 and 109, respectively. It may be noted that the differential amplifier 20 is operated as a Class A amplifier, that is, the transistors forming the differential amplifier are operated throughout the linear portion of their characteristic voltage-current operating curves.

The operation of the differential amplifier 20 is summarized as follows. With the wiper arm 124 set to apply a more positive voltage to the collector electrode of the transistor 116 than is applied to the collector electrode of the transistor 115, the more positive voltage applied to the base of the transistor 109 causes the transistor to conduct a proportionately greater amount of current than is conducted by the transistor 108. When the transistor 109 is rendered more conductive, its collector voltage goes more positive than the collector voltage of the transistor 108. This more negative collector voltage is applied to the base of the transistor 102 causing that transistor to be rendered more conductive than the transistor 101 with the result that the voltage at the collector electrode of the transistor 102 goes to a more positive value than the voltage at the collector electrode of the transistor 101. Conversely, if the collector voltage of the transistor 115 goes more positive than the collector voltage of the transistor 116, a more positive collector voltage will appear on the collector of the transistor 101 than appears on the collector of the transistor 102. Thus, the relative levels of the collector voltages which appear on the collector electrodes of the transistors 101 and 102 correspond to the relative levels of the collector voltages which appear on the collector electrodes of the transistors 115 and 116, respectively.

Referring again to FIGURE 2, emitter terminals 131 and 132 of the transistors 115 and 116, respectively, form a pair of output terminals for the comparator 19 and a pair of input terminals for the differential amplifier 20. The comparator 19 and the differential amplifier 20 are described in detail in copending continuation-in-part application, Ser. No. 620,304, filed Mar. 3, 1967, by John Nagy, Jr., and entitled "Solid State Relay," this continuation-in-part application being assigned to same assignee as the present invention. The comparator 19 and the differential amplifier 20 are merely exemplary of one possible arrangement for implementing our invention; this particular arrangement providing high sensitivity to voltage reversals between the emitter terminals 131 and 132 and low impedance to the input signal source. For some applications, however, neither of these factors may be important and, hence, resort may be made to other types of dual input-dual output comparators and differential amplifiers. Hence, it is not our intention to limit our invention to the comparator 19 or the differential amplifier 20 which is described in detail subsequently since other types of comparators and differential amplifiers may be used to fulfill other requirements.

The comparator 19 is comprised of a bridge having six resistive arms, four of the arms being designated by the numerals 135, 136, 137 and 138 and having equal values of resistance. These arms are connected at terminals 141 and 142 to terminals 143 and 144, respectively, by leads 145 and 146, respectively. The terminals 143 and 144 receive the variable amplitude input signal of indicated polarity. The arms 135 and 136 are joined together and connected by a lead 147 to the wiper arm 18 of set point 2. The arms 137 and 138 are also joined together and connected by a lead 148 to the wiper arm 17 of set point 1. The fifth arm of the comparator bridge 19 is formed by a resistor 151 having one end connected to a terminal 141 and the opposite end connected to a terminal 152 which is connected by a lead 153 to the positive voltage terminal 50. Since the voltage or current which is derived from the set points 1 and 2 may be several orders of magnitude higher than the voltage or current amplitude of the input signal the resistance value of the current of the input signal resistor 151 may have to be made proportionately smaller than the value of resistance of any arms 135, 136, 137 and 138 to provide equal magnitudes of current flow between the terminals 142 and 152 for equal magnitudes of applied voltage. Obviously, if the voltage or current derived from the set points 1 and 2 is of the same order of magnitude as that of the input signal, the resistance value of the resistor 151 could be made equal to the value of resistance of any of the arms 135, 136, 137 or 138.

The sixth arm of the bridge is delineated by a group of broken lines and is designated generally by the numeral 155. The resistance offered by the arm 155, as viewed from the terminals 142 and 152, is made equal to the resistance of the arm 151 and is partly attributable to the equivalent series resistance of a resistance network which connects the terminals 131 and 132 which includes resistors 161, 162, 163 and 164, and is partly attributable to the series emitter resistance of the transistors 115 and 116. The arm 155 serves as to detect voltage differences caused by comparing the input signal voltage amplitude to the amplitudes of the corresponding set point signal voltages which are alternately applied to the terminal 152 as positive voltages. The voltage at the terminal 152 will remain more positive than the voltage at the terminal 142 until the input signal voltage, which appears as a positive voltage on the terminal 142, exceeds the voltage on the terminal 152 at which time a reversal of voltage polarity occurs between the two terminals. This reversal in voltage polarity will cause a corresponding reversal in the direction of resultant current flow through the arm 155 so that the emitter terminal 131 now receives more current than the emitter terminal 132. When this condition occurs the voltage on the collector of the transistor 115 will go more positive than the voltage on the collector of the transistor 116. A reversal in voltage polarity of the collector electrodes of the transistors 115 and 116 will be detected and amplified by the amplifier 20 and reflected by a reversal of relative voltage levels of the collector electrodes of the transistors 102 and 101, respectively; the collector of the transistor 101 now going more positive than the collector of the transistor 102. Since the arm 155 may have a resistance value which is proportionately less than the resistance value of any of the arms 135, 136, 137 or 138, a proportionately lesser amplitude of signal which is tapped off the resistors 48 and 52 may actually be compared to the input signal in this arm of the comparator 19. Therefore, the term "set point signal" as used herein refers to the voltage or current signal which is actually compared to the input signal amplitude rather than perhaps a proportionately higher voltage or current which is tapped off the resistors 48 and 52.

A wiper arm 168 has one end connected to the negative voltage lead 107 and the other end is movable to provide a variable resistance tap for the resistor 163. The wiper arm 168 may be adjusted to establish a null across the emitter terminals 131 and 132 when the relay is calibrated initially.

Before the input signal is applied to the terminals 143 and 144, it is necessary to effect the zero and full scale calibration of the relay 9, each calibration representing an extreme condition of relay operation. To effect the zero setting of the relay, the control signal is removed from the terminals 143 and 144 and a voltmeter is connected across the terminals 142 and 152. The wiper arms 17 and 18 are moved to their zero settings, that is, to positions in direct contact with the terminal 50. The wiper arm 168 is then adjusted until a null voltage appears cross the terminals 142 and 152. Thus, the terminals 131 and 132 will be at the same voltage level. The wiper arm 124 is then adjusted until the voltage on the collector of the transistor 102 is slightly more positive than the voltage on the collector of the transistor 101. This condition may be visually monitored by connecting the switch X to the collector of the transistor 102, FIGURE 2, and trimming the wiper arm 124 until the lamp 82 flickers on. The switch Y may be connected to the collector of the transistor 101, FIGURE 2, to ensure that the gate Y is disabled by the slightly more negative voltage on the collector electrode of the transistor 101 and that as a result the lamp 86 is not illuminated. If the null across the emitter terminals 131 and 132 is disturbed by this adjustment of the wiper arm 124, the wiper arm 168 may be adjusted again until a null voltage appears across these terminals. The wiper arm 124 may also have to be retrimmed to provide the visually observable condition of the lamp 82 just flickering on. With the relay finally set so that with only the lamp 2 flickering on and a null voltage appears across the emitter terminals 131 and 132, the voltmeter is removed from the terminals 142 and 152 and the zero calibration of the relay is accomplished.

To effect the full scale calibration of the relay, the wiper arms 17 and 18 are moved to full scale positions, as indicated by the broken lines. A source of known amplitude input signal from, for example, a battery, is then applied to the terminals 143 and 144, the amplitude of this signal corresponding to the full scale calibration of the relay. In the particular case described hereinabove, this amplitude would be 100 microamperes. With the wiper arm 17 at its full scale setting, the resistor 47 may be trimmed until the collector electrode of the transistor 102 is slightly more negative than the collector electrode of the transistor 101. This condition may be visually monitored by connecting the switch X to the collector of the transistor 102 and trimming the resistor 47 until the lamp 82 flickers off. Conversely, the resistor 51 is trimmed until the collector electrode of the transistor 101 receives a slightly more positive voltage than the collector of the transistor 102. This condition may be visually monitored by connecting the switch Y to the collector of the transistor 101 and trimming the resistor 51 until the lamp 86 flickers on. The known signal source may be disconnected from the terminals 143 and 144 and the relay is then full-scale calibrated as well as zero-scale calibrated.

The operation of the aforedescribed relay is summarized as follows: The relay 9 is initially calibrated for a zero and full scale setting in a manner similar to that described hereinabove. Assuming that the lamp 82 is turned on by an initially more positive voltage on the collector electrodes of the transistors 116 and 102 and that the input signal amplitude increases and approaches the amplitude of the set point signal derived from the set point 1. The set point 2 is assumed to be providing the higher amplitude set point signal. As the amplitude of the input signal increases, the terminal 142 of the comparator 19 goes increasingly more positive and the voltage difference appears between the terminals 142 and 152 decreases correspondingly so that less current flows into the emitter terminal 132. However, until the positive voltage on the terminal 142 exceeds the positive voltage on the terminal 152, the relative states of conduction of the transistors 115 and 116 will remain unchanged, the collector of the transistor 116 remaining more positive than the collector of the transistor 115. Thus, the relative states of conduction of the transistor pairs comprising the differential amplifier 20 will remain unchanged and the collector of the transistor 102 will remain more positive than the collector of the transistor 101. With the switches X and Y in the positions depicted by FIGURE 2, the lamp 82 illuminates as evidence of this situation.

As the input signal amplitude further increases to a level where the voltage at the terminal 142 is now of greater amplitude than the voltage at the terminal 152, the direction of current flow through the arm 155 will reverse in response to this reversal of voltage polarity between the emitter terminals 131 and 132. Assuming that the amplitude of the positive input signal which appears on the terminal 142 has not exceeded the amplitude of the positive voltage which appears on the terminal 152 when the set point 2 is being compared to the input signal, the reversal of polarity between the terminals 142 and 152 will occur only during positive half cycles when the set point 1 is compared to the input signal. The reversal of voltage polarity during these positive half cycle intervals will be reflected by the collector of the transistor 115 going more positive during every positive half cycle than the collector electrode of the transistor 116. Thus, the collector of the transistor 101 will go more positive than the collector of the transistor 102 during every positive half cycle but will reverse during every negative half cycle when the input signal amplitude is compared to the amplitude of the set point signal which is derived from the set point 2 and which alternately appears as a higher positive voltage on the terminal 152.

As the amplitude of the input signal continues to increase until the voltage at the terminal 142 exceeds the voltage at the terminal 152 during every negative half cycle that set point 2 is sampled and compared to the input signal, more current will now flow into the emitter terminal 131 than flows into the emitter terminal 132. Thus, during every negative half cycle, the transistor 115 will be rendered less conductive than the transistor 116 causing the collector voltage of the transistor 115 to go more positive than the collector voltage of the transistor 116. Accordingly, the collector of the transistor 101 will be more positive than the collector electrode of the transistor 102 during every negative half cycle. Since it has been assumed that the input signal is one of increasing amplitude and that the set point 2 has a higher amplitude than the set point 1, during each positive half sampling cycle the voltage polarity of the terminals 131 and 132 will remain unchanged, and the voltage on the collector of transistor 101 will appear essentially as a D.C. voltage which is more positive than a similar D.C. voltage which appears on the collector of transistor 102.

If the amplitude of the input signal thereafter decreases to a lesser value than the set point signal derived from set point 2, the voltage on the terminal 131 will become more negative than the voltage on the terminal 132 during each negative half cycle that the set point 2 is compared to the control signal amplitude. Again, a reversal of voltage polarity between the collector electrodes of the transistors 101 and 102 occurs each half cycle.

Whether the gate X or the gate Y is fully enabled during corresponding alternate positive and negative half cycles will be determined by the instantaneous amplitude of the positive input signal voltage which appears on the terminal 142 as compared to the positive set point signal voltage which appears on the terminal 152 and the connection that the bases of the gates X and Y make the collectors of the transistors 101 and 102. Since the amplitude of the input signal which is applied to the relay is typically derived from a source external to the relay and is, therefore, not normally controllable by the relay, the particular mode of load state for a given range of control amplitude is readily and easily established by providing the appropriate connections through the switches X and Y between the bases of the gates X and Y and the collectors of the transistors 101 and 102. For instance, if the switches X and Y are in the positions depicted by FIGURES 2 or 3B and the collector of transistor 101 has a more positive voltage than the collector of transistor 102 when either set point is sampled, the gate Y will be partially enabled during every negative half cycle by the transistor 410 turning on but the gate X will be held disabled by the more negative voltage on the collector of the transistor 102, even though the transistor 400 turns on and partially enables that gate during each positive half cycle. With the gates X and Y connected as illustrated by FIGURE 3A, the above situation will be reversed; the gate X now being enabled every positive half cycle and the gate Y remaining disabled.

On the other hand, if the relative voltage polarities of the transistor collector is reversed so that the more positive voltage is now on the collector of transistor 102 with the switches X and Y providing the connections depicted by FIGURE 2, the gate Y will be disabled by the more negative voltage on the collector of transistor 101 and the gate X wil be fully enabled during every positive half cycle when the transistor 400 turns on. With the switches X and Y in the positions as depicted in FIGURE 3A, the reverse will be the situation; the gate Y being fully enabled every negative half cycle by the more positive voltage on the collector of the transistor 102 and the gate X being held disabled by the more negative voltage on the collector of the transistor 101.

Every time either gate is fully enabled it provides a gating signal to its associated control which energizes to connect an associated load to the source 10. For example, every negative half cycle that the gate Y is enabled, its associated control 14 is energized and connects the load 12 to the source 10. The capacitor 93 charges every time the gate Y provides a gating signal and discharges to maintain the connection between the load 12 and the source 10 even though the gate Y is disabled every positive half cycle. The gate Y will be fully enabled every negative half cycle until a reversal of voltage polarity occurs between the collector electrodes of transistors 101 and 102. In this event, the control 14 is deenergized when the capacitor 93 discharges to a voltage level which is no longer sufficient to keep its associated blocking oscillator in an oscillating state. If the gate Y is not enabled before the capacitor 93 discharges to that voltage level, the control 14 deenergizes and disconnects the load 12 from the source 10.

The control 13 operates in a similar manner and is energized by a gating signal from the gate X when the gate X is initially fully enabled and remains energized after the subsequent disabling of the gate X through the discharge of capacitor 91.

As will be evident to those working in the art, Table I taken in conjunction with FIGURES 3A–3D, inclusive, may be used as a basis for selecting a particular connection of the switches X and Y which will provide any one of four modes of load control for a known overall range of control amplitude variation and two set point signals that lie within that range.

While there has been described what is at present considered to be a preferred embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. A dual set point solid state relay comprising, at least one pair of control devices for selectively connecting different ones of at least two loads to a source of load power in response to an energizing signal applied thereto, first and second set point signal sources for providing respective first and second electrical signals having individual amplitudes corresponding to different ones of the dual set points, means coupled to the set point signal sources for alternately sampling each set point signal, means for alternately driving the sampling means, means coupled to the set point signal sources to receive the sampled set point signals therefrom for alternately comparing the amplitudes of the two set point signals to the amplitude of an input signal that is applied to the relay to control the operation thereof, the comparing means producing first and second output voltages, each voltage having one of two polarities depending on the amplitudes of different ones of the sampled set point signals as compared to the amplitude of the input signal, logic circuitry coupling the control devices to the comparing means for supplying energizing signals to the control devices, said logic circuitry requiring a synchronizing pulse and a voltage of a predetermined polarity from said comparing means to provide said energizing signal, and means coupled to said means for alternately driving said sampling means and alternately driven thereby to provide synchronizing pulses to said logic circuitry.

2. A dual set point solid state relay comprising, means for generating alternate first and second electrical signals having individual amplitudes corresponding to different ones of the dual set points, means coupled to the set point signal generating means for alternately comparing the amplitudes of the two set point signals to the amplitude of an input signal that is received by the comparing means and applied to the relay to control the operation thereof, the comparing means producing alternate first and second output voltage signals in predetermined phase relationship with the first and second set point signals, each voltage signal having one of two polarities depending upon the amplitude of different ones of the set point signals as compared to the amplitude of the input signal, at least two load control devices, each control device being operable to selectively connect a source of power to at least one load that is associated with each control device but requiring a synchronizing voltage and a coincidental voltage signal of a predetermined polarity to operate, means for supplying the first and second output voltage signals from said comparing means to the load control devices and, means synchronized with said set point signal generating means for applying a synchronizing voltage to one of said load control devices while a corresponding one of the two set point signals is compared to the control signal by said comparing means.

3. A dual set point solid state relay comprising, a first and a second control device, each control device selectively connecting a different one of two loads to a source of alternating current in response to a gating signal applied thereto, first and second logic devices respectively connected to said first and second control devices for supplying gating signals thereto, each logic device requiring a synchronizing voltage pulse and a coincidental voltage signal of predetermined polarity to produce a gating signal, logic device synchronizing means connected to the alternating current source for supplying alternate first and second synchronizing voltage pulses to the respective first and second logic devices, means connected to said alternating current source and operated in synchronism with said device synchronizing means for generating alternate first and second electrical signals which are synchronized to the first and second synchronizing pulses, respectively, each of said first and second electrical signals having an amplitude that corresponds to the setting of a different one of the two set points, means coupled to the set point signal generating means for comparing the amplitudes of the first and second set point signals with the amplitude of an input signal that is received by the comparing means and applied to the relay to control the operation thereof, the comparing means producing alternate first and second voltage signals in phase with the alternate first and second set point signals, each voltage signal from said comparing means having one of two polarities depending upon amplitude of each set point signal as compared with the amplitude of the input signal, and means coupled to said comparing means for supplying the first and second voltage signals therefrom to said logic devices in synchronism with said respective first and second synchronizing pulses.

4. A dual set point solid state relay comprising, a first and a second control device, each control device being energized by a gating signal applied thereto to selectively connect a different one of two loads to a source of A.C. power, first and second gating devices connected to said first and second control devices for supplying gating signals thereto, each gating device requiring a synchronizing voltage pulse and a coincidental voltage signal of predetermined polarity to produce a gating signal, gating device synchronizing means connected to the A.C. power source for supplying successive first and second synchronizing voltage pulses to respective first and second gating devices, means connected to said power source and operated in synchronism with said gating device synchronizing means for generating successive first and second electrical signals which are synchronized to the first and second synchronizing pulses, respectively, each of said first and second electrical signals having an amplitude that corresponds to the setting of a different one of the two set points, means coupled to the set point signal generating means for comparing the amplitudes of the first and second set point signals with the amplitude of an input signal that is received by the comparing means and applied to the relay to control the operation thereof, the comparing means producing respective first and second output voltage signals, each output voltage signal from said comparing means having one of two polarities depending upon the amplitude of each set point signal as compared with the amplitude of the input signal, means coupled to said comparing means for supplying the first and second output voltage signals therefrom to said gating devices in synchronism with the first and second synchronizing pulses, and means for holding each control device energized for a predetermined period of time after a gating signal is removed therefrom.

5. A dual set point solid state relay comprising, a first and a second control device, each control device selectively connecting a different one of two loads to a source of A.C. power in response to a gating signal applied thereto, first and second logic devices, each logic device including first and second control electrodes and an output electrode and requiring a synchronizing voltage pulse on the first control electrodes and a coincidental voltage signal of predetermined polarity on the second control electrode to produce a gating signal on the output electrode, logic device synchronizing means connected to the A.C. power source for supplying successive first and second synchronizing voltage pulses to the first electrodes of the respective first and second logic devices, means connected to said power source and operated in phase synchronism with said device synchronizing means for generating successive first and second electrical signals which are synchronized to the first and second synchronizing pulses respectively, each of said first and second electrical signals having an amplitude that corresponds to the setting of a different one of the two set points, means coupled to the set point signal generating means for comparing the amplitudes of the first and second set point signals with the amplitude of an input signal that is received by the comparing means and applied to the relay to control the operation thereof, the comparing means producing first and second differential voltage signals which individually reverse polarity if the control signal passes a corresponding first or second set point signal as a result of a change in input signal amplitude, the comparing means including a pair of output terminals that receive the first and second differential voltage signals, differential voltage amplifying means including a pair of input terminals and a pair of output terminals, the input terminals being individually connected to the output terminals of said comparing means to receive the first and second differential voltage signals therefrom and the output terminals receiving amplified first and second differential voltage signals, and means for connecting the output terminals of said differential voltage amplifying means to the second control electrode of at least one of the logic devices.

6. A dual set point solid state relay comprising a first and a second control device, each control device energizing in response to a gating signal applied thereto, to selectively connect a different one of two loads to a source of A.C. power, first and second logic devices, each logic device including first and second control electrodes and an output electrode and requiring a synchronizing voltage pulse on the first control electrode and a coincidental voltage signal of predetermined polarity on the second control electrode to produce a gating signal on the output electrodes, logic device synchronizing means connected to the A.C. power source for supplying successive first and second synchronizing voltage pulses to the first electrodes of the respective first and second logic devices, means connected to said power source and operated in synchronism with said device synchronizing means for generating successive first and second electrical signals which are synchronized to respective first and second synchronizing pulses, each of said first and second electrical signals having an amplitude that corresponds to the setting of a different one of the two set points, means coupled to the set point signal generating means for comparing the amplitudes of the first and second set point signals with the amplitude of an input signal that is received by the comparing means and applied to the relay to control the operation thereof, the comparing means producing first and second differential voltage signals which individually reverse polarity if the input signal passes a corresponding first or second set point signal as a result of a change in input signal amplitude, the comparing means including a pair of output terminals that receive the first and second differential voltage signals, differential voltage amplifying means including a pair of input terminals and a pair of output terminals, the input terminals being individually connected to the output terminals of said comparing means to receive the first and second differential voltage signals therefrom and the output terminals receiving amplified first and second differential voltage signals, means connecting the output terminals of said differential amplifying means to the second control electrode of at least one of the logic devices, and means for holding each control device energized for a predetermined period of time after a gating signal is removed therefrom.

7. The relay as claimed in claim 6, wherein the means connecting the output terminals of said differential amplifying means comprises two conductors individually connected to different ones of the second control electrodes of the logic devices.

8. The relay as claimed in claim 7, wherein the means for connecting the output terminals of said differential amplifying means comprises two conductors, both conductors being connected to the second control electrode of one of the logic devices.

9. A dual set point solid state relay comprising, a first D.C. source for producing first signal having an amplitude corresponding to a first selected set point, a second D.C. source for producing a second signal having an amplitude corresponding to a second selected set point, a source of A.C. power, set point multiplexing means coupled to the A.C. source and driven at the frequency of the current produced by said A.C. source to alternately sample the first and second D.C. sources that provide the respective first and second set point signals, means coupled to said first and second D.C. sources for alternately comparing the amplitudes of the sampled first and second set point signals to the coincidental amplitude of a control signal that is received by the comparing means and applied to the relay to control the operation thereof, the comparing means producing successive first and second voltages in predetermined phase relationship with respective first and second set point signals, each of the first and second voltages from said comparing means having one of two polarities depending upon the respective amplitudes of the first and second set point signals as compared with the control signal amplitude, at least two load control devices, each control device being operable to selectively connect said A.C. source to at least one load that is associated with each control device but requiring a synchronizing voltage and a coincidental input voltage of a predetermined polarity to operate, means for supplying the first and second voltages from said comparing means to the load control devices as input voltages therefor, and load control synchronizing means coupled to the A.C. source and driven in phase synchronism with said multiplexing means to apply alternate synchronizing voltages to the load control devices, whereby one of the load control devices receives a synchronizing voltage during an interval when one of the two set point signals is compared to the control signal by said comparing means.

References Cited

UNITED STATES PATENTS 3,354,399 11/1967 Houpt et al. ______ 328—153 X

ROBERT K. SCHAEFER, *Primary Examiner.*

H. J. HOHAUSER, *Assistant Examiner.*

U.S. Cl. X.R.

328—153